Oct. 13, 1925.

A. R. HAVENER 1,557,050

LACING STUD SETTING MACHINE

Filed Oct. 25, 1924    2 Sheets-Sheet 1

Inventor:
Arthur R. Havener,
By his attorney,
Charles S. Gooding

Oct. 13, 1925.
A. R. HAVENER
1,557,050
LACING STUD SETTING MACHINE
Filed Oct. 25, 1924       2 Sheets-Sheet 2
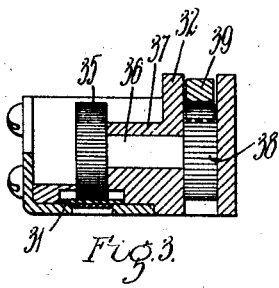
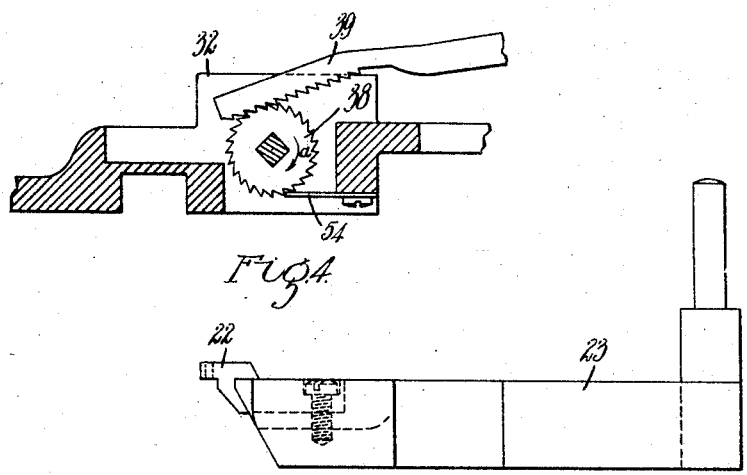
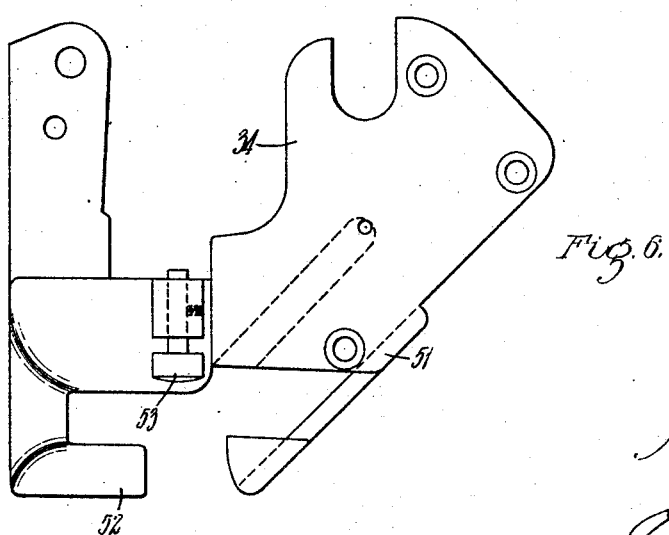
Inventor:
Arthur R. Havener,
by his attorney,
Charles S. Gooding.

Patented Oct. 13, 1925.

1,557,050

UNITED STATES PATENT OFFICE.

ARTHUR R. HAVENER, OF WAYLAND, MASSACHUSETTS, ASSIGNOR TO JUDSON L. THOMSON MANUFACTURING CO., OF WALTHAM, MASSACHUSETTS, A CORPORATION OF MASSACHUSETTS.

LACING-STUD-SETTING MACHINE.

Application filed October 25, 1924. Serial No. 745,788.

*To all whom it may concern:*

Be it known that I, ARTHUR R. HAVENER, a citizen of the United States, residing at Wayland, in the county of Middlesex and State of Massachusetts, have invented new and useful Improvements in Lacing-Stud-Setting Machines, of which the following is a specification.

This invention relates to a lacing stud setting machine which is adapted to set lacing studs in the uppers of boots and shoes, and also is adapted to set said studs in a reinforcing tape, in order that the stud shall have a firmer hold upon the upper and shall be harder to detach therefrom under the ordinary conditions of use.

The object of the invention is to provide a machine of the character set forth which will automatically feed the upper and the reinforcing tape and which will feed the reinforcing tape to the upper at an angle to the direction in which the upper is fed, that is, it may be fed at an acute angle, or it may be fed at a right angle thereto. The reinforcing tape after being fed to the upper is attached thereto by a lacing stud which is driven through the upper and clenched in the tape, and after the reinforcing tape has thus been attached to the upper by the stud, the portion so attached is cut off and the upper is then fed forward together with the edge portion of the reinforcing tape to space the studs.

The machine in which my invention is embodied is substantially the same as to a mechanism for punching a hole in the upper, a mechanism for feeding and setting the lacing hooks or studs and a mechanism for feeding the upper to space the studs, as the machine illustrated in United States Patent to Arthur R. Havener, "Machine for setting lacing hooks," No. 977,090, patented November 29, 1910. I have, however, added to this machine and adapted the machine for operation with a reinforcing tape positioning, feeding and cutting mechanism.

In certain respects the invention of this application resembles the invention disclosed in United States Letters Patent issued to Arthur R. Havener, No. 1,301,432, patented April 22, 1919, but differs therefrom in the mechanism for feeding the tape to the punch, the tape feeding mechanism of this invention being mounted upon the presser foot of the machine and maintaining the same relation to said presser foot in its various positions. The tape feeding mechanism is one of the principal features, therefore, of this invention and its object is to provide accuracy in feeding and to provide a mechanism for feeding the tape step by step independently of the feed of the shoe upper and in a direction at an angle to the direction in which the upper is fed.

With these objects in view the invention consists in the combination and arrangement of parts set forth in the following specification and particularly pointed out in the claims thereof.

The term "lacing stud" is used throughout the specification and claims to indicate not only a lacing hook but an eyelet, as the invention is equally applicable to the setting of eyelets in an upper and reinforcing piece as well as lacing hooks.

The drawings are devoted principally to the illustration of the manner in which the reinforcing strip is fed, attached to the upper and cut off, and the mechanisms whereby the necessary movements are imparted to the punch, die and lacing hook carrier and for feeding the lacing hooks to the lacing hook carrier are to be found in said Letters Patent No. 977,090, to which reference may be had.

Referring to the drawings:—

Fig. 3 is a sectional elevation taken on line 3—3, Fig. 1, and illustrating a portion of the tape feeding mechanism.

Fig. 4 is a sectional elevation taken on line 4—4, Figure 1, and illustrating a portion of the tape feeding mechanism.

Fig. 5 is a detail front elevation of the punching die and its slide.

Fig. 6 is a plan view of the work support.

Like numerals refer to like parts throughout the several views of the drawings.

Figure 1:
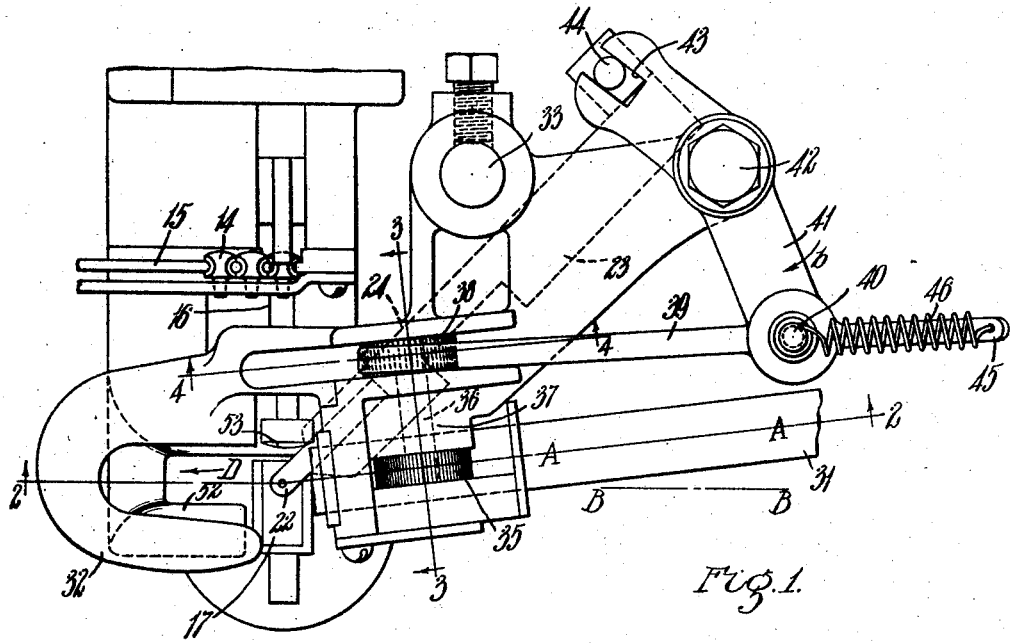
Figure 1 is a plan view of the tape feeding mechanism, presser foot, work support, and a portion of the lacing hook feeding mechanism.

In the drawings, 10 is the punch which is formed upon the lower end of a stud 11, which has an annular clenching surface 12 thereon constituting an anvil against which the shank of the lacing hook strikes to clench the same during the setting operation. This stud 11 is screw threaded to engage a slide 13 which constitutes a punch holder and to which a vertical movement and a lateral movement are imparted by mechanism which is disclosed in said United States Patent No. 977,090, to which reference may be had.

The lacing hooks 14 are fed down a raceway 15 and then are carried along an auxiliary raceway 16 on to a lacing hook carrier plate 17 which is fastened to a lever 18 pivotally mounted on a slide 19 which slides in ways 20 in the frame 21 of the machine and to which a vertical reciprocatory motion is imparted by mechanism disclosed in said Letters Patent No. 977,090.

A die plate 22 co-operates with the punch 10 in punching holes in the upper and reinforcing tape and is fastened to a slide 23 which is guided to slide in ways 24 formed in the frame of the machine, these ways being arranged at an angle to the direction in which the upper is fed, as hereinafter explained.

A reciprocatory motion is imparted to the slide 23 and the die 22 by a link 25 pivotally connected at its upper end at 26 to a bell crank lever 27 which is pivoted at 28 to the frame of the machine. The vertical arm of the bell crank lever 27 engages a sliding block 29 which is slidable vertically in a slot 30 formed in the die slide 23. The link 25 is connected to the slide 19 as illustrated in said Letters Patent and as the slide 19 moves up and down a reciprocatory motion is imparted to the slide 23 and to the die plate 22 which is fast thereto.

The strip of reinforcing tape 31 is fed toward the punching instrumentalities along a line A—A, Figure 1, which is inclined at an angle to the line B—B along which the shoe upper is fed. The tape 31 is fed by a mechanism which is supported upon a presser foot 32, which is fastened to a vertical reciprocatory shaft 33, to which vertical motion is imparted by the mechanism set forth in said Letters Patent No. 977,090. The presser foot 32 co-operates with a work support 34 fast to the frame of the machine and illustrated in detail in Figure 6.

The tape feeding mechanism referred to consists of a feed wheel 35 corrugated upon its periphery and fast to the front end of a shaft 36 journalled to rotate in a bearing 37 in said presser foot. The feed wheel 35 is preferably corrugated upon its periphery and has an intermittent rotary motion imparted thereto in the direction of the arrow a, Figure 4, by a ratchet 38 fast to the rear end of the shaft 36 and to which an intermittent rotary motion is imparted by a toothed pawl 39, the front end of which engages the teeth of the ratchet 38 and the rear end of which is pivoted to a stud 40 fast to the front end of a lever 41 which in turn is pivoted at 42 to the presser foot. The opposite end of the lever 41 is provided with a slot 43 through which a vertical pin 44 projects, the lower end of the pin 44 being fastened to, or integral with the die plate slide 23.

The rear end of the pawl 39 has an upwardly extending arm 45 thereon which is connected by a spring 46 to the stud 40. The pawl 39 is loosely mounted upon the stud 40 so that it can rock thereon to a sufficient extent to allow the front end thereof to pass over the teeth on the ratchet 38 during the forward movement of the pawl, preparatory to rotating said ratchet to operate the feed wheel 35, and thus feed the tape 31 forwardly toward the punch. It will thus be understood that the teeth on the underside of the front end of the pawl 39 are held against the teeth on the ratchet 38 by a spring pressure.

A primary cutter 47 is fastened to a bracket 48, which in turn is fastened to the stud 11.

A secondary cutter 49 is fastened to the presser foot adjacent to the punch 10 and has a slot 50 therein, and in alignment with the slot 50 there is a slot 56 extending through a portion of the presser foot. These slots 50 and 56 constitute a guideway through which the tape 31 can be fed.

The work support 34, as will be seen by reference to Fig. 6 consists of two parts 51 and 52 and an edge gage 53 is supported upon the part 52 of the work support.

The general operation of the mechanism hereinbefore specifically described and illustrated is as follows:—

Figure 2:
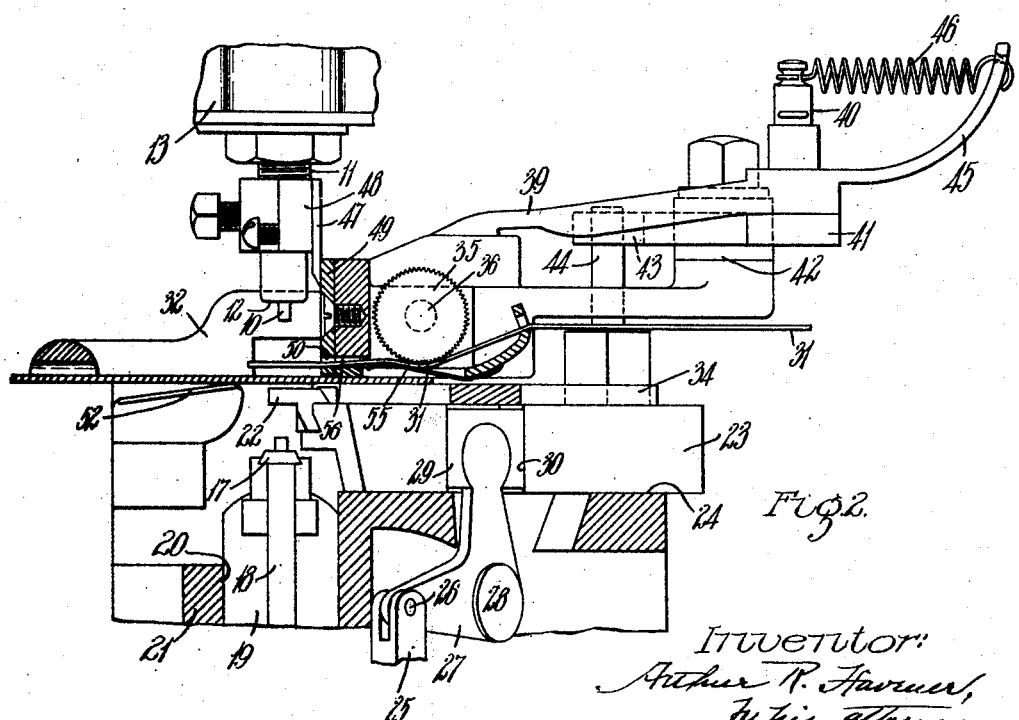
Fig. 2 is a sectional elevation taken on line 2—2, Figure 1, and broken away to save space.

Assuming the parts to be in the position illustrated in Figures 1 and 2, the presser foot 32 is raised by means of a foot treadle, not shown in the drawings, sufficiently to allow the operator to introduce an upper of a shoe beneath the presser foot and to place said upper upon the work support 34 with its front edge resting against the edge gage 53. On the release of the presser foot it is carried down into contact with the upper which it holds firmly in position upon the work support.

At this time the reinforcing tape 31 is in an advanced position and projects beneath the punch 10. The operator now starting the machine, the punch descends and punches a hole in the tape and in the upper, co-acting with the die plate 22 in the punching operation.

At this time the primary cutter 47 just contacts with the upper surface of the reinforcing tape, but does not cut it. The punch now releases slightly and the die 22 moves backwardly out of alignment with the punch, the presser foot still holding the work upon the work support, and as said die is moved back by the die slide 23 by the mechanism hereinbefore described the pin 44 will rock the lever 41 in the direction of the arrow b, Figure 1, thus moving the pawl 39 toward the left, Figures 1 and 2, the teeth on the underside of the pawl at that time slipping over the teeth on the ratchet 38. The ratchet 38 is prevented from rotating in the direction opposite to that of the arrow a, by a spring 54 fast to the presser foot and engaging the teeth on the ratchet 38, see Fig. 4.

The tape 31 is prevented from slipping backwardly by a spring 55 which is fastened to the presser foot and bears against the tape, holding it against the underside of the feed wheel 35, so that during the forward movement of the pawl 39, just described, the feed wheel will be held against rotation in an anticlockwise direction, and the tape will not be fed.

At the same time that the die 22 starts to move backwardly out of alignment with the punch 20 and lacing hook carrier, the lacing hook carrier, with the lacing hook on the plate 17, starts to move upwardly being moved by the slide 19 and forces the lacing hook shank through the upper and the reinforcing tape, the punch at this time projecting into the hole in the shank of the lacing hook, and also at this time, a slight downward movement is imparted to the punch to meet the carrier during the latter part of the setting operation, and this downward movement of the punch begins as soon as the die 22 has moved sufficiently laterally of the punch to clear the same, and thus the shank of the lacing hook is clenched against the anvil clenching surface or anvil 22 upon the punch. The punch is now lifted slightly to release the pressure upon the lacing hook.

As soon as the lacing hook has been set in the upper, as hereinbefore set forth, the lacing hook carrier plate 27 is moved to clear the same from the lacing hook. At this time the presser foot is raised in order that the upper may be fed and this raising of the presser foot is automatically performed by mechanism described in said Letters Patent No. 977,090, and when said presser foot moves upwardly, the secondary cutter 49 co-acts with the primary cutter 47 to cut a section from the end of the strip of reinforcing tape 31 which has already, as hereinbefore described, been fastened to the upper by a lacing stud.

A lateral movement is next imparted to the punch while the same is projecting into the shank of the lacing hook to feed the upper the proper distance to space the hooks, and in the direction of the arrow D, Figure 1. This lateral movement is accomplished by means of the mechanism described in said Patent No. 977,090 and the punch is moved laterally with the upper and the reinforcing piece which has been cut from the tape the required distance to space the hooks.

During the feeding of the upper hereinbefore described, the lacing hook carrier slide descends to the position illustrated in Fig. 2 and the lacing hook carrier plate 17 is thus brought into alignment with the end of the auxiliary raceway 26 and another lacing hook is then placed on said lacing hook carrier plate by mechanism illustrated and described in said Letters Patent. When the punch has fed the upper, as hereinbefore described, the presser foot is automatically lowered to clamp the upper to the work support again.

While the lacing hook carrier slide 19 is descending, it is evident that the die 22 and the die slide 23 will be moved forwardly and this will rock the lever 41 in a direction opposite to the arrow b, Figure 1, which will move the pawl 39 toward the right, Figure 1, and thus will impart to the ratchet 38 a partial rotation in a clockwise direction, see Fig. 4, the tape 31 being held firmly against the periphery of the feed wheel 35, said feed wheel at this time feeding the tape forwardly to the position illustrated in Fig. 2.

The punch now having fed the lacing hook, upper and reinforcing section forward, moves upwardly out of the lacing hook and then moves laterally to its first position as in Figure 2 in readiness to descend and the cycle of operations hereinbefore described is then repeated to punch the upper and reinforcing tape, set the lacing hook in said upper and reinforcing tape, sever the reinforcing tape and feed the upper, and during the return downward movement of the lacing hook carrier slide 19 the reinforcing tape will be fed forward in position to be again attached to the upper by the lacing hook, as hereinbefore described.

It will be understood that the die plate 22 and the die slide 23 constitute in effect a single piece and as such are referred to in some of the following claims as a die.

I claim:

1. A machine for setting a lacing stud in the upper of a boot or shoe and in a reinforcing strip therefor having, in combination, a punch and anvil, a die adapted to cooperate with said punch, mechanism adapted to move said punch and anvil longitudinally thereof toward said die, mechanism adapted to subsequently move said die out of alignment with said punch while said punch is inserted in said upper and reinforcing strip, means adapted to sever said strip from the portion which has been punched, mechanism adapted to move said punch laterally thereof to feed said upper and said severed portion of said strip, and means mounted on said presser foot and operated by said die adapted to impart a step by step feeding movement to said reinforcing strip.

2. A machine for setting a lacing stud in the upper of a boot or shoe and in a reinforcing strip therefor having, in combination, a work support, a presser foot provided with a guideway for a reinforcing strip, a punch and anvil, a die adapted to co-operate with said punch, mechanism adapted to move said punch and anvil longitudinally thereof toward said die, mechanism adapted to subsequently move said die out of alignment with said punch while said punch is inserted in said upper and reinforcing strip, means adapted to sever said strip from the portion which has been punched, mechanism adapted to move said punch laterally thereof to feed said upper and said severed portion of said strip, and means operated by said die adapted to impart a step by step feeding movement to said reinforcing strip in a direction at an angle to the movement of said die.

3. A machine for setting a lacing stud in the upper of a boot or shoe having, in combination, a punch and anvil, a die adapted to co-operate with said punch, a work support, a presser foot provided with a guideway for a reinforcing strip, mechanism to move said die toward and away from said punch, a feed wheel on said presser foot adapted to feed said strip toward the punch, and mechanism mounted on said presser foot and operated by said die to impart an intermittent rotary movement to said feed wheel.

4. A machine for setting a lacing stud in the upper of a boot or shoe having, in combination, a punch and anvil, a die adapted to co-operate with said punch, a work support, a presser foot provided with a guideway for a reinforcing strip, mechanism to move said die toward and away from said punch, a feed wheel on said presser foot adapted to feed said strip toward the punch, a ratchet fast to said feed wheel, a pawl engaging said ratchet, a lever pivoted to said presser foot and connected to said pawl, and means on said die engaging said lever, whereby a step by step movement may be imparted to said strip.

5. A machine for setting a lacing stud in the upper of a boot or shoe having, in combination, a punch and anvil, a die adapted to co-operate with said punch, a work support, a presser foot provided with a guideway for a reinforcing strip, mechanism to move said die toward and away from said punch, a feed wheel on said presser foot adapted to feed said strip toward the punch, a ratchet fast to said feed wheel, a pawl engaging said ratchet, a lever pivoted to said presser foot and connected to said pawl, means on said die engaging said lever, whereby a step by step movement may be imparted to said strip, and means to press said strip against said feed wheel.

6. A machine for setting a lacing stud in the upper of a boot or shoe having, in combination, a punch and anvil, a die adapted to co-operate with said punch, a work support, a presser foot provided with a guideway for a reinforcing strip, mechanism to move said die toward and away from said punch, a feed wheel on said presser foot adapted to feed said strip toward the punch, a ratchet fast to said feed wheel, a pawl engaging said ratchet, a lever pivoted to said presser foot and connected to said pawl at one end thereof, and a pin fast to said die and projecting into a slot provided in said lever, whereby a step by step movement may be imparted to said strip.

In testimony whereof I have hereunto set my hand.

ARTHUR R. HAVENER.